United States Patent
Upshaw et al.

(10) Patent No.: US 7,151,155 B2
(45) Date of Patent: Dec. 19, 2006

(54) COPOLYMERS OF CYCLIC ESTERS AND CYCLIC FORMALS

(75) Inventors: Thomas A. Upshaw, Somerset, NJ (US); Angelo Mellozzi, North Plainfield, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 10/344,396

(22) PCT Filed: Apr. 17, 2001

(86) PCT No.: PCT/US01/12324

§ 371 (c)(1),
(2), (4) Date: Jun. 13, 2003

(87) PCT Pub. No.: WO02/16465

PCT Pub. Date: Feb. 28, 2002

(65) Prior Publication Data

US 2004/0014932 A1   Jan. 22, 2004

(51) Int. Cl.
   *C08G 18/42*   (2006.01)
   *C08G 18/40*   (2006.01)
   *C08G 18/79*   (2006.01)
   *C08G 63/08*   (2006.01)
   *C08G 63/00*   (2006.01)

(52) U.S. Cl. .................. 528/80; 528/355; 528/356; 528/365; 560/2; 560/129

(58) Field of Classification Search .............. 528/80, 528/355, 356, 365; 560/2, 129
See application file for complete search history.

(56) References Cited

U.S. PATENT DOCUMENTS

| | | | | |
|---|---|---|---|---|
| 4,233,408 A | * | 11/1980 | Satterly et al. | 521/172 |
| 5,449,743 A | * | 9/1995 | Kobayashi et al. | 528/355 |
| 6,689,463 B1 | * | 2/2004 | Chou et al. | 428/378 |

FOREIGN PATENT DOCUMENTS

| | | | |
|---|---|---|---|
| FR | 2050106 | * | 3/1971 |
| GB | 1332862 | * | 10/1973 |

* cited by examiner

Primary Examiner—Rabon Sergent

(57) ABSTRACT

Disclosed are copolymers of cyclic esters, e.g., caprolactone, and cyclic formals of substituted or unsubstituted diols, e.g., 1,3-dioxepane. The copolymers can provide a low melting temperature rendering them liquids at room temperature. Elastomeric polyurethanes prepared from such copolymers can exhibit a low Tg transition and good resistance to hydrolysis and oxidation. The copolymers are particularly useful for elastomers, coatings, adhesives, inks or binders requiring low temperature flexibility and good resistance to hydrolysis and oxidation.

28 Claims, 3 Drawing Sheets

COPOLYMERS OF CYCLIC ESTERS AND CYCLIC FORMALS

FIELD OF THE INVENTION

The present invention is directed to copolymers of cyclic esters, e.g., ε-caprolactone, and cyclic formals, e.g., 1,3-dioxepane, a process for their manufacture and polyurethanes prepared therefrom.

BACKGROUND OF THE INVENTION

Polyester polyols are often used in the manufacture of urethane elastomers, coatings, adhesives, ink binders, and the like. In some cases, the polyols are used as mixtures to achieve a balance of properties. Many polyester and polyether polyols have melting temperatures above room temperature and usually must be heated to liquify them before use. The resulting polyurethane or polyurethane-containing article may be subject to outdoor conditions or wet environments, which can cause gradual hydrolysis and eventual failure of the polyurethane. Certain applications such as artificial leather and shock-absorber components must withstand repeated flexing without failure, sometimes at low temperatures.

In some cases, polyether polyols, which often impart better resistance to hydrolysis than polyester polyols, can be used instead of polyester polyols. However, polyester polyols or copolymers containing ester groups impart certain advantageous properties to polyurethanes which may be required for adequate performance in a given application, such as tear resistance, oil, hydrocarbon or solvent resistance, high temperature stability, adhesion, paintability, high tensile strength, vibrational damping properties, and the like.

Polycaprolactone polyols provide the additional advantages, relative to other aliphatic polyester polyols, of higher purity and consistency, longer pot life (in reactive formulations) and especially lower viscosity. They also can provide articles with the advantages of lower color, lower permanent set (elastomers), improved weatherability, and better hydrolytic stability.

However, despite the advantages of polycaprolactone polyols, in some applications improvements in low-temperature flexibility are required. Also desired are polyols which are liquid at or close to ambient temperature to render them more easily handled without heating. Although low-temperature flexibility properties can be improved by use of certain polyether polyols (e.g., polytetrahydrofuran type), such polyols suffer from oxidative instability which renders them unsuitable for certain applications where sustained exposure to hot conditions or ultraviolet light is expected.

U.S. Pat. No. 3,845,160 discloses polymers of trioxane with either ε-caprolactone or 1,3-dioxepane as a comonomer present in minor amount, but does not specifically disclose copolymers of ε-caprolactone and 1,3-dioxepane as the major components nor copolymers without trioxane as the major component.

British Patent 1,252,824 discloses an aqueous dispersion of a modified polyacetal prepared from a terpolymer of 93% trioxane with 5% 1,3-dioxepane and 2% propiolactone, but does not specify copolymers of other lactones, nor copolymers without trioxane as the major component.

Japanese Patent 03126751 A2 discloses blends of aliphatic polyesters including polycaprolactone in copolymers of trioxane and 1,3-dioxepane for the purposes of improving the crystallization rate and heat resistance of subsequent compositions.

All of these prior art disclosures are directed toward improved poly(1,3,5-trioxane) polymers, and utilize 1,3-dioxepane and lactones and their polymers only as modifiers, not as the main constituents of the compositions.

SUMMARY OF THE INVENTION

By virtue of the present invention, it is now possible to provide copolymers for use, for example, in polyurethane elastomers, coatings, adhesives, inks and binders with better low-temperature flexibility (lower glass-transition temperature) than those made using polyester homopolymers and better oxidative stability than those made using polyether homopolymers, and to provide articles made from such compounds. More specifically, the present invention provides copolymers (also referred to herein as "polyols") of cyclic esters, e.g., ε-caprdlactone hereinafter referred to as caprolactone) and cyclic formals (formaldehyde acetals) of substituted or unsubstituted diols having at least 3, preferably 3 or 4, carbon atoms between the hydroxyl groups of the diol, e.g., 1,3-dioxepane.

The present invention also provides a process for manufacturing the copolymers.

The present invention also provides a polyurethane comprising the reaction product of an organic isocyanate and the improved copolymers.

The present invention also provides a further improvement where compositions comprising the copolymers further comprise a carbodiimide additive which imparts improved stability.

DETAILED DESCRIPTION OF THE INVENTION

Any cyclic esters polymerizable with the cyclic formals hereinafter described are suitable for use in accordance with the present invention. Typical cyclic esters include, for example, lactones, lactides and glycolides. Preferred cyclic esters have at least a 5 membered ring, preferebly a 5 to 9 membered ring, i.e., including carbon and oxygen. More preferably, the cyclic esters are lactones selected from the group consisting of γ-butyrolactone, δ-valerolactone, ε-caprolactone and derivatives thereof. ε-Caprolactone is especially preferred.

Any cyclic formal of a substituted or unsubstituted diol having at least 3, preferably 3 or 4, carbon atoms between the hydroxy groups of the diol are suitable for use in accordance with the present invention. When such cyclic formals are substituted, the substituents may be, for example, methyl, ethyl, propyl, butyl, oxo (carbonyl oxygen), methoxy, ethoxy, propoxy, or other organic groups which do not readily participate or interfere with the copolymerization.

One especially preferred cyclic formal for use in accordance with the present invention is 1,3-dioxepane (also known in the art as 1,3-dioxacycloheptane or 1,4-butanediol formal).

The amounts of the cyclic ester and cyclic formal are not critical to the present invention. Typically, the sum of the concentrations of the cyclic ester monomer and the cyclic formal monomer are at least about 50 wt. %, more preferably at least about 75 wt. % and most preferably at least about 90 wt. % based on the total weight of the copolymer. i.e., the weight of monomers used to make the copolymer. Preferably, the weight ratio of cyclic ester, e.g., caprolactone, to cyclic formal, e.g., 1,3-dioxepane, is from about 0.05:1 to 20:1, more preferably from about 0.3:1 to 3:1.

In addition to the cyclic ester and the cyclic formal, other monomers polymerizable with the cyclic ester and the cyclic formal may be employed in the copolymers of the present invention. Typical of such other monomers are cyclic carbonates such as 1,3-dioxepan-2-one, 5,5-dimethyl-1,3-dioxan-2-one, 1,3-dioxan-2-one, ethylene carbonate, and propylene carbonate, lactones such as 1,4-dioxane-2-one, 1,4-dioxepan-2-one, 1,5-dioxepan-2-one, 1,6-dioxepan-2-one, 3,6-dimethyl-1,4-dioxane-2,5-dione (lactide), 1,4-dioxane-2,5-dione (glycolide), and cyclic formals such as trioxane. Typically, the copolymers are polymerized from less than about 50 wt. %, preferably less than about 25 wt. %, more preferably less than about 10 wt. % and most preferably less than about 1 wt. % of such other monomers based on the total weight of the copolymer.

Further details concerning monomers suitable for use in accordance with the present invention are known to those skilled in the art. Such monomers are readily commercially available.

In addition to the cyclic ester and the cyclic formal and other optional monomers suitable for use in accordance with the present invention, other functional molecules which initiate the ring-opening polymerization and are incorporated only once into the polymer may be employed in the copolymers of the present invention. Such molecules are employed to control the rate and molecular weight of the polymer and are variously called initiators, starters, or chain-transfer agents. Herein, they shall be called initiators.

Initiators used to initiate polymerization of the copolymers of the present invention contain at least one hydroxyl group, and preferably two or more. Such initiators are known to those skilled in the art, and any such initiator can be used in conjunction with the copolymers of the present invention. Typically, such initiators contain from about 2 to 12 carbon atoms and can optionally include other functional groups that do not serve as initiator groups under the polymerization conditions, such as ether, carboxylic acid, ester, carbonate, amide, urea, halogen, or tertiary amine groups. Some or all of the hydroxyl groups needed for initiation of the copolymerization can be replaced with other initiating groups such as primary or secondary amine groups. Water can also serve as the initiator.

Initiators with different structures and functionalities can also be blended or prepared as a mixture, in order to give a polyol with a specific desired average functionality and composition.

Illustrative of initiators useful in the present invention are ethylene glycol, 1,4-butanediol, 1,6-hexanediol, 1,3-propanediol, 2,2-dimethyl-1,3-propanediol, diethylene glycol, triethylene glycol, glycerol, 2-ethyl-2-hydroxymethyl-1,3-propanediol, 2-methyl-2-hydroxymethyl-1,3-propanediol, 2-methyl-2-ethyl-1,3-propanediol, 2-ethyl-2-butyl-1,3-propanediol, 1,3-bis(hydroxymethylcyclohexane), 1,4-bis(hydroxymethylcyclohexane), hydrophobic alcohols, fatty alcohols, dimer acid alcohols, ethoxylated or propoxylated adducts of any of the above alcohols, and the like. More examples of initiators are known to those skilled in the art, for example those listed in D. M. Young, F. Hostettler, L. C. Shriver, R. W. McLaughlin, *Proc. Amer. Chem. Society Fall Meeting, Div. Paint, Plast. Printing Ink Chem.*, September 1956, pp 108–114 and F. Hostettler, G. Magnus, H. Vineyard, U. S. Pat. No. 3,284,417 (Nov. 8, 1966), incorporated herein by reference.

The amount of the initiator is not critical to the present invention. Typically, the amount of initiator is from about 1 to 30 weight per cent, based on the total weight of the copolymer. Further details concerning such appropriate initiator compounds are known to those skilled in the art and encompass all such initiators useful for ring-opening polymerization of the cyclic esters and cyclic formals of the present invention. While the particular initiator used can influence certain specific properties of the copolymer and the reaction conditions, its primary purpose is to control the rate of the polymerization reaction and to control the molecular weight of the resulting copolymer. Therefore the specific initiator used is not a limiting aspect of the present invention.

The particular catalysts used to polymerize the copolymers of the present invention are not critical. Illustrative of the catalysts useful for the reaction are strong acids such as, for example, trifluoromethanesulfonic ("triflic") acid, trifluoroacetic acid, methanesulfonic acid, fluorosulfonic acid, toluenesulfonic acid, phosphoric acid, anhydrous sulfuric acid, anhydrous hydrochloric acid and the like. Various cationic ring-opening catalysts known to those skilled in the art can also be used, for example methyl triflate, triflic anhydride or various onium salt catalysts. Various transition-metal complexes known to those skilled in the art can also be used as catalysts. Mixtures of the catalysts can also be used if desired. The catalysts are typically used in amounts of from about 0.0005 weight percent to 1 weight percent, preferably from about 0.001 weight percent to 0.5 weight percent, and most preferably from about 0.002 weight percent to 0.2 weight percent based on the total weight of the reactor charge, i.e., monomers and initiators. The catalyst may be added to the reaction all at one time, in discrete portions that may be of the same or different size, or in a continuous uniform or non-uniform manner over the entire reaction time period or over a portion of the reaction time period.

The copolymers of the present invention can be produced by any means known to those skilled in the art. Typically, the copolymers are produced by reacting the polymerization initiator with the monomers in the presence of the catalyst to control the reaction rate and the final molecular weight achieved. A variety of conditions, such as those used to polymerize cyclic ester homopolymers and cyclic formal polymers, can be used in the polymerization.

In accordance with the present invention, it has been found that random copolymers can be produced by the copolymerization of the cyclic ester and the cyclic formal under conditions of strong acid catalysis. By varying the catalyst type and amount, the reaction conditions and the order of monomer addition, it is possible to get a polymer with a somewhat blocky (less random) composition as well.

The random copolymer has less order in the polymer chains than the analogous cyclic ester homopolymer and hence has a very low melting point, in many cases below room temperature. The random versus blocky nature of a given copolymer may be confirmed by detailed C-13 and proton NMR analysis.

In general, suitable cyclic monomer-derived units in the copolymers of the present invention can be added to the initiator by a variety of methods known to those skilled in the art. For example the monomer-derived units ("repeat units") can be added by ester- or ether-interchange reactions between the initiator and a higher molecular weight copolymer, resulting in incorporation of the initiator groups into the copolymer and giving the polyols of the present invention.

A preferred method of incorporating suitable monomer-derived units into the polyols of the present invention is to carry out the reaction of the initiator with cyclic ester and cyclic formal in the presence of the catalyst. The monomers can be mixed together before reaction with the initiator, or one of the monomers can be polymerized first. The initiator can be polymerized with any combination of the two monomers, followed by polymerization with the remainder of the monomers as a mixture or sequentially. Either monomer may be added to the reaction mass all at one time, in discrete portions that may be of the same or different size, or in a continuous uniform or non-uniform manner over the entire reaction time period or over a portion thereof. Any profile of monomer composition or time of addition known to the art can be used, in order to achieve various desired reaction conditions and polyol compositions.

The polymerization can be carried out at temperatures effective to achieve a reasonable reaction time, typically about 25° C. to 200° C. and preferably about 60° C. to 140° C. The reaction temperature will depend on the catalyst employed. The optimal temperature will also depend on the propensity of a given catalyst to cause undesired side-reactions, as well as the equipment used. Ideally the temperature will be high enough to lower the final viscosity of the polyol product to a workable range and to minimize reaction time, while low enough to avoid unwanted side-reactions and excessive heat generation.

The polymerization can optionally be carried out in a solvent, which can be removed at the end of the reaction, for example, by distillation. However, carrying out the polymerization in the absence of solvent simplifies the isolation of the product and maximizes the amount of product obtained from a reactor of a given volume, and is therefore preferred.

The presence of water is usually disadvantageous to the reaction, and pre-drying of the starting materials, separately or in combination, is preferably carried out before adding the catalyst by any of the various material drying procedures known to the art, such as vacuum treatment, passing a dry gas through the molten polyol, stripping, distillation, the use of inert drying agents to absorb water, or heating the reaction components with a water-azeotroping solvent at or above the solvent's boiling temperature to facilitate water removal.

Even with these drying procedures, great care must be taken to prevent water from entering the reaction mixture, where it can result in the rapid increase of the acid number of the polyol. The post-reaction inclusion of acid-scavengers, such as carbodiimides, is useful in lowering the acid number of the copolymer product, neutralizing the catalyst, and stabilizing the copolymer against later degradation and is therefore preferred. The amount of carbodiimide added can be readily calculated from the acid number of the copolymer and should represent a molar equivalent amount in excess of that number. Typical carbodiimide additives useful in this regard and which are commercially available include, for example, Stabaxol I, Stabaxol P, Stabaxol P-200 and other Stabaxol products from Rhein Chemie Company, and UCARLNK XL-29SE from Union Carbide Corporation.

The copolymers of the present invention typically have a number average molecular weight of at least 250, preferably at least 400, and for use in coatings and elastomers, preferably from about 250 to 6000, more preferably from about 400 to 4000 grams per gram-mole. Methods for determining number average molecular weight are known to those skilled in the art. One such method is size exclusion chromatography (SEC), including gel permeation chromatography (GPC). For the polyols of the present invention and of under about 6000 number average molecular weight, a preferred method of determining number-average molecular weight is by hydroxyl end-group titration.

Typically, the improved copolymers of the present invention will comprise the reaction products of from about 0.5 to 80, preferably from about 1 to 40 and more preferably from about 2 to 20 weight percent of the initiator, typically from about 20 to 99.5, preferably from about 60 to 99 and more preferably from about 80 to 98 weight per cent of the cyclic monomers based upon the total weight of the copolymer. In a preferred aspect of the invention, the composition of the cyclic monomer mixture used will preferably be from 5 to 95 and more preferably from 10 to 90 weight per cent caprolactone, with the balance of the cyclic monomer mixture comprising 1,3-dioxepane.

When the polymerization is complete, residual unreacted monomers can optionally be removed by vacuum treatment, passing dry nitrogen, air or other gas through the molten polyol, or by distillation or stripping procedures known to the art.

It has been found that some of the copolymers of the invention are liquid at room temperature, particularly those containing substantial levels of repeat units derived from the cyclic formal.

Quite surprisingly, it has been found that urethane elastomers made from the copolymers of the invention can exhibit a lower glass-transition temperature ("Tg") by dynamic mechanical analysis ("DMA") than those made from most polycaprolactone and adipate polyester polyols. As a result, they can exhibit flexibility to a lower temperature before becoming glassy and rigid. Preferably, urethane elastomers made from the copolymers of the present invention have a Tg at least 2° C. lower, more preferably at least 5° C. lower and most preferably at least 10° C. lower than a urethane elastomer having the same composition, but made with polycaprolactone of equal molecular weight.

Quite surprisingly, it has also been found that the copolymers of the invention can be stabilized by addition of carbodiimide acid-scavengers, whereupon they can exhibit excellent hydrolytic stability, surprisingly greater than would be expected from their acetal (formal) group-containing composition.

Furthermore, it has also been found that urethane elastomers made using the copolymers of the invention possess better oxidative stability at elevated temperatures (130° C.) than comparable elastomers made using polytetramethylene ether polyols, as measured by stress relaxation in air using DMA.

For the foregoing reasons, the copolymers of the present invention exhibit a balance of properties that makes them unique and useful as a new type of polyol for use in polyurethanes.

The copolymers of the present invention and polyurethanes made from them can be used for a broad variety of articles including, for example, elastomers, coatings, inks, molded objects, sealants, adhesives, tapes, impact-resistant or transparent resins, elastomeric fibers, and the like.

The copolymers of the present invention can also be used as components in elastomers, coatings, inks, molded objects, sealants, adhesives, tapes, impact-resistant or transparent resins, elastomeric fibers and the like, comprising urethane or non-urethane resins.

EXAMPLES

The following examples present illustrative aspects of this invention and are not intended to limit its scope.

Measurements and test procedures used in the examples are as follows:

Hydroxyl Number Titration

The hydroxyl number of each polyol was determined according to the method described in S. L. Wellons, M. A. Carey, D. K. Elder, *Analytical Chemistry,* 52, 1374 (1980), incorporated herein by reference.

Acid Number Titration

Calibration a) Weigh 0.02 to 0.05 grams of potassium hydrogen phthalate to the nearest 0.1 mg into each of two 250-mL Erlenmeyer flasks and record the weight.

b) Add approximately 50 mL of distilled water to each of the flasks and swirl until all of the potassium hydrogen phthalate is dissolved.

c) Add 3 to 4 drops of 1 percent methanolic phenolphthalein indicator to each flask.

d) Titrate each flask to the first permanent pink endpoint with 0.02 N alcoholic potassium hydroxide solution and record the amount of titrant used.

e) Average the result of the two trials to determine the normality of the KOH.

Procedure a) Add approximately 200 mL of an acid solvent solution, consisting of 24 parts anhydrous isopropanol, 4 parts distilled water and 3 parts methylene chloride by volume, and 3 to 4 drops of 1 percent methanolic bromothymol blue indicator to a 500-mL Erlenmeyer flask.

b) Maintaining a nitrogen atmosphere in the flask, titrate with 0.02 N alcoholic potassium hydroxide to a stable blue-green endpoint.

c) Add 30.00 to 40.00 grams of sample to the system, weighed to the nearest 0.01 grams, and continue stirring until the sample is completely dissolved. Record this weight.

d) Titrate with standardized 0.02 N alcoholic potassium hydroxide back to the stable blue-green endpoint and record the amount of titrant added.

Calculations (Weight of potassium hydrogen phthalate×4.8967)/ (mL of alcoholic potassium hydroxide)=Normality of alcoholic potassium hydroxide (Titration in mL×Normality of the KOH×56.1)/ Sample weight=Acid number (mg KOH per g of sample)

Elastomer Property Tests

Elastomer properties were tested according to the standard ASTM methods shown in Table 1 and using the hydrolysis, DMA and stress relaxation methods described below.

TABLE 1

| Test Method | ASTM Number | Method Title |
| --- | --- | --- |
| Bashore Rebound | D 2632-96 | Rubber Property - Resilience by Vertical Rebound |
| Shore A Hardness | D 2240-91 | Rubber Property - Durometer Hardness |
| Compression Set | D 395-89 | Rubber Property - Compression Set |
| Die C Tear | D 624-91 | Tear Strength of Conventional Vulcanized Rubber and Thermoplastic Elastomers |
| Tensile Strength | D 412-92 | Vulcanized Rubber and Thermoplastic Rubbers and Thermoplastic Elastomers - Tension |
| Ultimate Elongation | D 412-92 | Vulcanized Rubber and Thermoplastic Rubbers and Thermoplastic Elastomers - Tension |

Hydrolysis Resistance

A relative humidity chamber (Hotpack Corp. Model #435304) was set to maintain a temperature of 80° C. and 80% relative humidity. Cast elastomer plaques of about 1 mm thickness were cut into dumbbell (Die Type IV) specimens. Three dumbbell specimens of each elastomer were tested for initial tensile strength ($T_0$). The remaining specimens were placed in the humidity chamber. After one week, three specimens of each elastomer were removed from the chamber and tested for tensile strength ($T_w$). Thereafter, weekly samples were removed and tested until there were no more samples left or the elastomer had degraded to the point of crumbling under slight pressure during handling. The percent tensile strength remaining was calculated as $[T_w/T_0] \times 100$.

Tan Delta by Dynamic Mechanical Analysis (DMA)

Each elastomer sample was placed into the fixture of a Rheometrics Solids Analyzer (model RSA II by Rheometrics Scientific Inc.), and cooled to −100° C. The sample geometries for the respective 1/6/5 and 1/3/2 elastomers were dual cantilever with sample dimensions of about 6.5 mm×45 mm×1 mm, and film & fiber fixture with sample dimensions of about 6.5 mm×35 mm×1 mm. The frequency was set to 6.28 rad/s and readings of the elastic modulus (E') and viscous modulus (E") were taken every 2 minutes as the temperature was increased to 180° C. at a rate of 2° C./min. The tan delta was calculated as E"/E'.

Oxidative Stability by Stress Relaxation

Each elastomer sample was placed into the RSA II, heated to 130° C. under dry air, and a constant strain of 2% elongation was applied. The air was dried using a Wilkerson Compressed Air Dryer before entering the chamber containing the test sample. Periodic readings of the force required to maintain a 2% strain were taken over 48 hours.

General Method of Preparation of Copolymers

Equipment and General Procedures

The formulations used for the copolymers of Examples 1–3 are given in Table 2. A 1-L round-bottom, 4-necked flask with a mechanical stirrer, temperature probe connected to a temperature controller, mantle, vacuum pump, manometer, bubbler, and assorted syringes and needles dried in a 115° C. forced air oven, were used in the copolymer preparation. Dry nitrogen gas was continuously passed through the reaction mixture at a flow rate of about 400 cc/min. Moisture determination was carried out using a Mitsubishi Moisture Meter model CA-06. A gas chromatograph (Hewlett Packard model HP6890 GC) was used to analyze the reaction for completion, i.e., the amounts of the monomers remaining unreacted. The acid catalyst was neutralized in the samples for GC analysis using a few drops of a 10% pyridine solution in ethyl acetate. Acid number determination was done using a Brinkmann Instruments Inc. model 686 Titroprocessor.

Raw Materials

The ε-caprolactone used was TONE® Monomer ECEQ from Union Carbide Corporation. The 1,3-dioxepane was obtained from Grant Chemical Division, Ferro Corporation, and dried over sodium sulfate. The 1,4-butanediol (BDO), pyridine, and triflic acid were obtained from Aldrich Chemical Company. The Stabaxol carbodiimide additives were obtained from Rhein Chemie Corporation. The sources of other raw materials used in the Examples are identified in such Examples.

Example 1

Preparation of 50/50 Caprolactone/1,3-dioxepane Copolymer

The formulation used for the copolymer is given in Table 2 below. The BDO and ECEQ monomer were charged to the reaction flask. The solution was heated to 80° C. and dried under a reduced pressure of 70 mmHg to less than 25 ppm of moisture. After breaking the vacuum, the dioxepane was charged via double-ended needle under a pressure of dry nitrogen. The resulting solution was heated at 90–100° C. and sparged with nitrogen until the moisture level was below 10 ppm. The solution was allowed to cool to room temperature (23° C.) and 0.0201 grams of triflic acid was added by means of a dried syringe and needle. After 24 hours the reaction temperature was increased to 40° C. for 1.5 hours, then stirring was continued at ambient temperature for 17 hours. When the TONE® ECEQ monomer level was less than 1 wt % by GC analysis, carbodiimide (Stabaxol I) was added to reduce the acid number to less than 1 and to deactivate the triflic acid. Unreacted 1,3-dioxepane was removed by vacuum distillation at 110° C. and 3–5 mmHg. Once the remaining dioxepane was less than 1 weight per cent, the copolymer was allowed to cool to 50° C. under vacuum, discharged from the reaction vessel and analyzed by hydroxyl number and acid titrations and by gel permeation chromatography and nuclear magnetic resonance spectroscopy ("NMR").

Example 2

Preparation of 75/25 Caprolactone/1,3-dioxepane Copolymer

The formulation used for the copolymer is given in Table 2 below. The copolymer was prepared according to the method of Example 1, except that the weight ratio of caprolactone to 1,3-dioxepane was 3 and the reaction temperature was 50° C. The carbodiimide used was Stabaxol P. After removal of the unreacted 1,3-dioxepane, the copolymer was heated to 60° C. and filtered through cheese cloth to remove agglomerated particles resulting from silica gel in the Stabaxol P.

Example 3

Preparation of 75/25 Caprolactone/1,3-dioxenane Copolymer

The formulation used for the copolymer is given in Table 2 below. The copolymer was prepared according to the method of Example 1, except that the weight ratio of caprolactone to 1,3-dioxepane was 3 and the reaction temperature was 40° C. Also, the final moisture content of the reactant solution was 11 ppm after overnight sparging with dry nitrogen. The carbodiimide used was Stabaxol P-200.

TABLE 2

| | EXAMPLE | | |
|---|---|---|---|
| | Example 1 | Example 2 | Example 3 |
| | | Polyol Type | |
| | 50:50 CL/dioxepane | 75:25 CL/dioxepane | 75:25 CL/dioxepane |
| 1,4-BDO Initiator (g) | 27.05 | 90.16 | 90.13 |
| Caprolactone (g) | 286.48 | 1432.89 | 1432.82 |
| 1,3-dioxepane (g) | 279.1 | 494.89 | 487.79 |
| ppm water after drying | 7 | 6 | 11 |
| Triflic Acid catalyst (g) | 0.0201 | 0.0871 | 0.0977 |
| Acid number (mg KOH/g) | 1.19 | 2.96 | 2.29 |
| Carbodiimide | Stabaxol I | Stabaxol P | Stabaxol P-200 |
| Amount added (g) | 1.19 | 30.22 | 42.87 |
| Final acid number (mg KOH/g) | 0.67 | 1.53 | 0.46 |
| Hydroxyl Number (mg KOH/g) | 63.30 | 51.90 | 55.90 |
| Mw/Mn (GPC) | | | 1.70 |

General Preparation of Cast Elastomers

Examples 4–9

Comparative Examples 10–14

The elastomer compositions of Examples 4–9 and Comparative Examples 10–14 were prepared according to the following procedure, with the stoichiometry shown in Tables 3–6 below.

Raw Materials

The comparative caprolactone polyol used was TONE® polyol 2241, the 1,4-butanediol (BDO) adipate polyol used was Millester 7-55 (Polyurethane Specialties Corporation) and the polytetramethylene ether glycol (PTMEG) polyol used was Terathane 2000 (Du Pont Corporation). These polyols all had a number-average molecular weight about 2000 and were used as received. The 4,4'-diphenyl-methane diisocyanate (MDI) was obtained from Bayer Corp. The MDI charge was corrected for each elastomer based on the % NCO value obtained for the MDI by back titration using dibutylamine (ASTM Method D2442-91).

Equipment

A 1-L resin kettle with 4-necked removable lid, a mechanical stirrer, temperature probe connected to a temperature controller, and mantle was used in the cast elastomer preparation. The reaction was carried out under a dry nitrogen atmosphere.

A 500-ml round bottom, 3-neck flask with magnet and stirrer, temperature probe with temperature controller, and mantle was used in pre-drying the polyols. Dry nitrogen was used to release the vacuum and blanket the polyols.

A 1-L round bottom, 3-neck flask with magnet and stirrer, thermometer, mantle, and temperature controller were used in pre-drying the BDO. Dry nitrogen was used to release the vacuum and blanket the BDO.

The following were dried in a 115° C. forced air oven prior to use: 250-ml Erlenmeyer flasks, 24-inch 12-gauge double-ended needle, assorted syringes, and needles. Moisture determination was done using a Mitsubishi Moisture Meter model CA-06.

Procedure

The polyol was melted in 115° C. oven, charged to the 500-ml 3-neck round bottom flask and dried for a minimum of two hours at 110° C. under vacuum (3–5 mmHg). The MDI was charged to the 1-liter resin kettle, purged with nitrogen for 15–20 minutes, and slowly heated to 70° C. under nitrogen. The BDO was vacuum-dried for a minimum of 2 hours at 100° C. and allowed to cool to 25–30° C. under vacuum. The polyol was vacuum-dried to a moisture level less than 100 ppm, then at 110° C. it was transferred under pressure to the MDI at 70° C. via a 24-inch 12-gauge double-ended needle over the course of about 30 minutes. The reaction temperature was maintained below 85° C. Once all of the polyol has been added to the MDI, the reaction was held at 85° C. for 2 hours (including the time of addition of the polyol to the MDI). Samples of the resulting prepolymer were taken for determination of % NCO by dibutylamine back-titration (ASTM Method D2442-91). The prepolymer was degassed for 30 minutes using vacuum (3–5 mmHg) for 30 minutes and its temperature was brought to 70° C. The dried BDO was sampled for moisture to verify that its moisture level was about 100 ppm. The BDO at 25–30° C. was charged to the reaction vessel in one shot, and carefully stirred in, avoiding the introduction of excessive air bubbles into the mixture. Within 45 to 60 seconds the mixture went from cloudy to clear and at that time the homogeneous mixture was poured into 115° C. pre-heated molds that had been treated with mold release agent. The filled molds were placed in a forced-air oven at 115° C. for 17 hours. The cylindrical test samples used for compression set, rebound and hardness testing were de-molded after 1.5 hours and placed back in the oven. After 17 hours, the elastomer plaque mold used for the other test specimens was removed from the oven and allowed to cool to room temperature before de-molding. The cured elastomer samples were allowed to age for 30 days at room conditions before testing was performed. Tensile test specimens were further conditioned for a minimum of two days under controlled relative humidity conditions (50%) before testing.

TABLE 3

| | EXAMPLE | | |
|---|---|---|---|
| | Example 4 | Example 5 | Example 6 |
| | | Polyol Used | |
| | Example 1 | Example 2 | Example 3 |
| | | Polyol Type | |
| | 50:50 CL/dioxepane | 75:25 CL/dioxepane Carbodiimide | 75:25 CL/dioxepane |
| | Stabaxol I | Stabaxol P | Stabaxol P-200 |
| Polyol (g) | 184.98 | 243.27 | 236.13 |
| MDI (g) | 167.10 | 179.98 | 186.82 |
| Prepolymer NCO % | 13.16 | 11.72 | 12.30 |

TABLE 3-continued

| | EXAMPLE | | |
|---|---|---|---|
| | Example 4 | Example 5 | Example 6 |
| | | Polyol Used | |
| | Example 1 | Example 2 | Example 3 |
| | | Polyol Type | |
| | 50:50 CL/dioxepane | 75:25 CL/dioxepane Carbodiimide | 75:25 CL/dioxepane |
| | Stabaxol I | Stabaxol P | Stabaxol P-200 |
| 1,4-butanediol (g) | 45.69 | 50.10 | 51.35 |
| NCO Index | 108.5% | 106.8% | 107.8% |

TABLE 4

| | EXAMPLE | |
|---|---|---|
| | Comp Ex 10 | Comp Ex 11 |
| | Polyol Used | |
| | TONE 2241 | Millester 7–55 |
| | Polyol Type | |
| | caprolactone | BDO Adipate |
| | Carbodiimide | |
| | None | None |
| Polyol (g) | 233.05 | 197.76 |
| MDI (g) | 187.98 | 158.23 |
| Prepolymer NCO % | 12.29 | 12.18 |
| 1,4-butanediol (g) | 51.60 | 44.00 |
| NCO Index | 108.1% | 107.7% |

TABLE 5

| | EXAMPLE | | |
|---|---|---|---|
| | Example 7 | Example 8 | Example 9 |
| | | Polyol Used | |
| | Example 1 | Example 2 | Example 3 |
| | | Polyol Type | |
| | 50:50 CL/dioxepane | 75:25 CL/dioxepane Carbodiimide | 75:25 CL/dioxepane |
| | Stabaxol I | Stabaxol P | Stabaxol P-200 |
| Polyol (g) | 226.15 | 322.62 | 319.81 |
| MDI (g) | 101.43 | 120.55 | 126.96 |
| Prepolymer NCO % | 6.91 | 6.28 | 6.40 |
| 1,4-butanediol (g) | 22.22 | 27.36 | 29.57 |
| NCO Index | 107.6% | 105.6% | 103.3% |

TABLE 6

| | EXAMPLE | | |
|---|---|---|---|
| | Comp Ex 12 | Comp Ex 13 | Comp Ex 14 |
| | | Polyol Used | |
| | TONE 2241 | TONE 2241 | Terathane 2000 |
| | | Polyol Type | |
| | caprolactone | caprolactone | PTMEG |
| | | Carbodiimide | |
| | None | Stabaxol I | none |
| Polyol (g) | 318.80 | 321.85 | 407.90 |
| MDI (g) | 127.87 | 127.88 | 156.53 |
| Prepolymer NCO % | 6.34 | 6.14 | 6.12 |
| 1,4-butanediol (g) | 27.82 | 27.52 | 35.43 |
| NCO Index | 108.0% | 109.6% | 104.8% |

Four grams of Stabaxol I was added to 321.85 grams of molten TONE polyol 2241 obtained from Union Carbide Corporation and stirred at 80° C. for 15 minutes, immediately before use to make the elastomer of Comparative Example 13.

Figure 1:
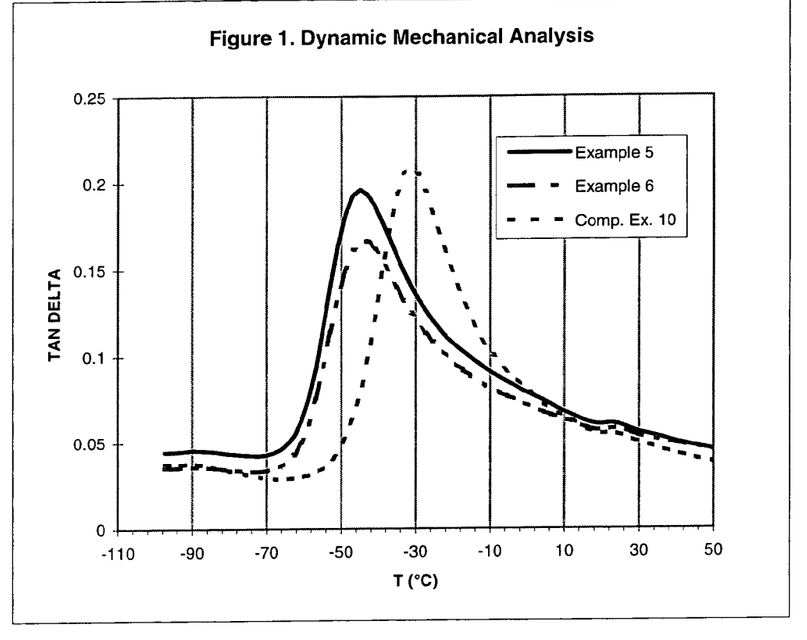
FIG. 1 is a graphical illustration showing the results of dynamic mechanical analysis for the elastomers of Examples 5 and 6 of the present invention compared to Comparative Example 10.

Tables 7–8 below and FIG. 1 show selected property data from the elastomers of Examples 4–6 which illustrate the lower glass-transition temperature obtained with the copolymers of the present invention relative to those observed for the elastomers of Comparative Examples 10–11 made using the using polyester (caprolactone or 1,4-BDO adipate) homopolymer polyols. Tables 7–8 also illustrate that other key elastomer properties are comparable and have not been significantly reduced by the use of the polyols of the invention.

TABLE 7

| | EXAMPLE | | |
|---|---|---|---|
| | Example 4 | Example 5 | Example 6 |
| | | Polyol Used | |
| | Example 1 | Example 2 | Example 3 |
| | | Polyol Type | |
| | 50:50 CL/dioxepane | 75:25 CL/dioxepane Carbodiimide | 75:25 CL/dioxepane |
| | Stabaxol I | Stabaxol P | Stabaxol P-200 |
| Bashore Rebound % | 51 | 53 | 54 |
| Shore D Hardness | 59 | 53 | 54 |
| Compression Set % | 27.31 | 25.73 | 27.27 |
| Die C Tear (lb/in) | 881 | 753 | 870 |
| Tensile Strength (psi) | 6568 | 6353 | 6132 |

TABLE 7-continued

| | EXAMPLE | | |
|---|---|---|---|
| | Example 4 | Example 5 | Example 6 |
| | | Polyol Used | |
| | Example 1 | Example 2 | Example 3 |
| | | Polyol Type | |
| | 50:50 CL/dioxepane | 75:25 CL/dioxepane Carbodiimide | 75:25 CL/dioxepane |
| | Stabaxol I | Stabaxol P | Stabaxol P-200 |
| Ult. Elongation (%) | 436 | 445 | 455 |
| DMA | | | |
| Tan Delta Tg (° C.) | −48.71 | −44.98 | −45.02 |

TABLE 8

| | EXAMPLE | |
|---|---|---|
| | Comp Ex 10 | Comp Ex 11 |
| | Polyol Used | |
| | TONE 2241 | Millester 7–55 |
| | Polyol Type | |
| | polycaprolactone | BDO Adipate |
| | CDI Type | |
| | None | None |
| Bashore Rebound % | 53 | 47 |
| Shore D Hardness | 58 | 53 |
| Compression Set % | 26.58 | 24.74 |
| Die C Tear (lb/in) | 862 | 756 |
| Tensile Strength (psi) | 8387 | 6744 |
| Ult. Elongation (%) | 435 | 392 |
| DMA | | |
| Tan Delta Tg (° C.) | −31.28 | −34.27 |

Figure 2:
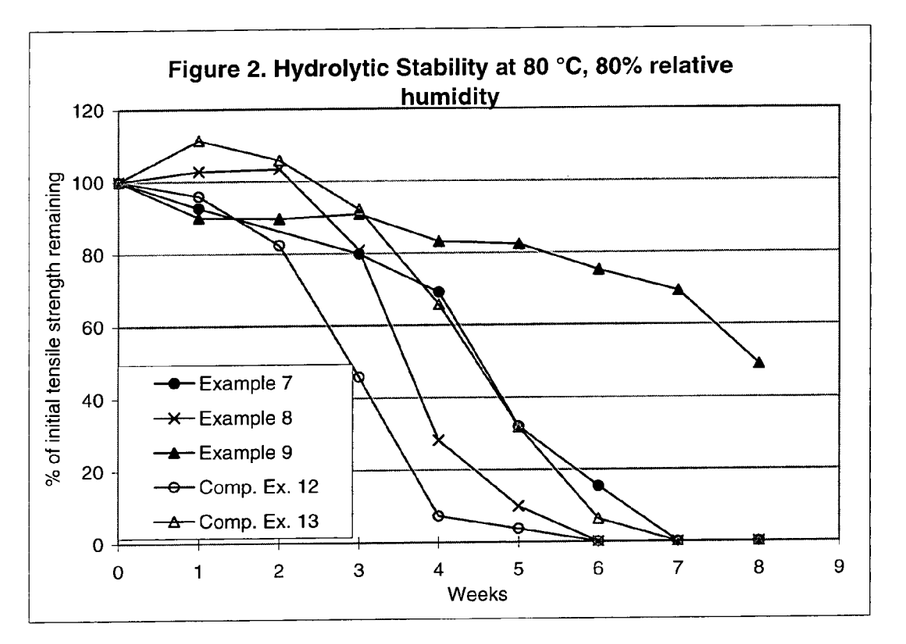
FIG. 2 is a graphical illustration showing the results of hydrolytic stability testing for the elastomers of Examples 7–9 of the present invention compared to Comparative Examples 12 and 13.

Table 9 below and FIG. 2 contain data comparing elastomers of Examples 7–9 which illustrate the good hydrolytic stability obtained with the copolymers of the present invention, comparable to or better than that observed for the elastomers of Comparative Examples 12 and 13 made using a caprolactone homopolymer polyol.

TABLE 9

| Elastomer of | Example 7 | Example 8 | Example 9 | Comp. Ex. 12 | Comp. Ex. 13 |
|---|---|---|---|---|---|
| Polyol Used | Example 1 | Example 2 | Example 3 | TONE 2241 | Tone 2241 |
| Polyol Type | 50:50 CL/dioxepane | 75:25 CL/dioxepane | 75:25 CL/dioxepane | caprolactone | caprolactone |
| Carbodiimide | Stabaxol I | Stabaxol P | Stabaxol P-200 | None | Stabaxol I |
| Weeks at 80° C., 80% r.h. | | | % of original tensile strength remaining | | |
| 1 | 92.6 | 102.8 | 90.0 | 95.9 | 111.4 |
| 2 | — | 103.4 | 89.6 | 82.3 | 105.9 |
| 3 | 79.9 | 80.9 | 90.9 | 45.8 | 92.2 |
| 4 | 69.1 | 28.3 | 83.3 | 7.3 | 65.8 |
| 5 | 32.0 | 9.9 | 82.4 | 3.7 | 31.9 |
| 6 | 15.3 | 0.0 | 75.2 | 0.0 | 6.3 |

TABLE 9-continued

| Elastomer of Polyol Used Polyol Type | Example 7 Example 1 50:50 CL/dioxepane | Example 8 Example 2 75:25 CL/dioxepane | Example 9 Example 3 75:25 CL/dioxepane | Comp. Ex. 12 TONE 2241 caprolactone | Comp. Ex. 13 Tone 2241 caprolactone |
|---|---|---|---|---|---|
| Carbodiimide | Stabaxol I | Stabaxol P | Stabaxol P-200 | None | Stabaxol I |
| Weeks at 80° C., 80% r.h. | | | % of original tensile strength remaining | | |
| 7 | 0.0 | 0.0 | 69.3 | 0.0 | 0.0 |
| 8 | 0.0 | 0.0 | 48.9 | 0.0 | 0.0 |

Figure 3:
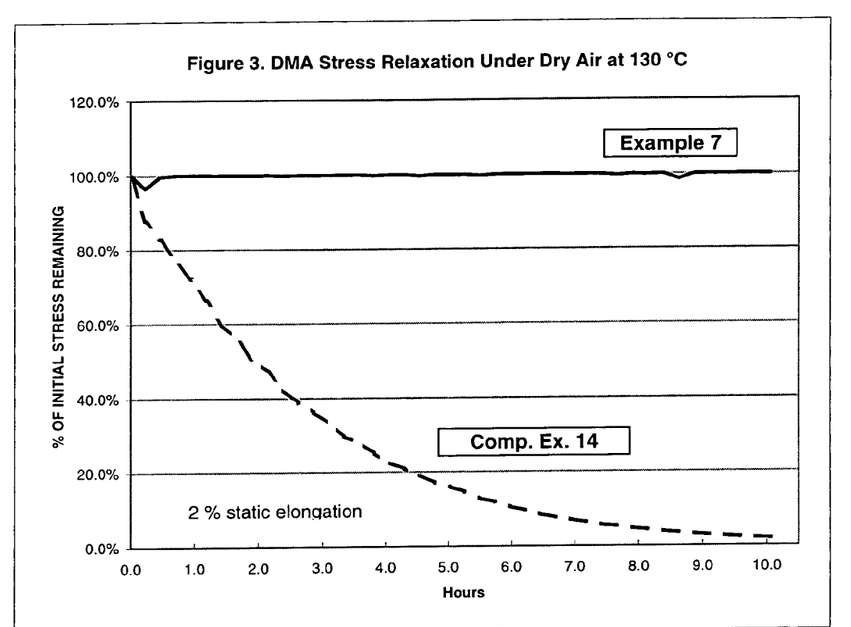
FIG. 3 is a graphical illustration showing the results of DMA stress relaxation testing for the elastomer of Example 7 compared to Comparative Example 14.

Table 10 below and FIG. 3 contain data which illustrate the better elevated-temperature oxidative stability obtained with the elastomer of Example 7 relative to that observed with the elastomer of Comparative Example 14 made using a polytetramethylene ether glycol (PTMEG) homopolymer polyol.

TABLE 10

| | Elastomer | |
|---|---|---|
| | Example 7 | Comp. Ex. 14 |
| | Polyol Used | |
| | Example 1 | Terethane 2000 |
| | Polyol Type | |
| | 50:50 CL/dioxepane | PTMEG |
| | Carbodiimide | |
| Time (hrs)* | Stabaxol I force(time)/force(time zero) | none |
| 1 | 100% | 68% |
| 2 | 100% | 50% |
| 3 | 99% | 34% |
| 4 | 100% | 24% |
| 5 | 100% | 16% |
| 6 | 100% | 11% |
| 7 | 100% | 7% |
| 8 | 100% | 5% |
| 9 | 100% | 3% |
| 10 | 100% | 2% |

*hours at 130° C., 2% elongation in dry air

Although the invention has been described above with respect to specific aspects, those skilled in the art will recognize that other aspects are intended to be included within the scope of the claims which follow.

We claim:

1. A copolymer polymerized from monomers including,
 (i) a cyclic ester of at least a five membered ring; and
 (ii) a cyclic formal of a substituted or unsubstituted diol having at least 3 atoms between the hydroxyl groups of the diol;
wherein the cyclic ester and the cyclic formal monomers comprise at least 50 wt. % of the total monomers based on the total weight of the copolymer; wherein the copolymer is polymerized in the presence of a polymerization initiator selected from the group consisting of ethylene glycol; 1,4-butanediol; 1,6 hexanediol; 1,3-propanediol; 2,2-dimethyl-1,3-propanediol; diethylene glycol; triethylene glycol; glycerol; 2-ethyl-2-hydroxymethyl-1,3-propanediol; 2-methyl-2-hydroxymethyl-1.3-propanediol; 2-methyl-2-ethyl-1,3-propanediol; 2-ethyl-2-butyl-1,3-propanediol; 1,3-bis (hydroxymethylcyclohexane); 1,4-bis (hydroxymethylcyclohexane); and mixtures thereof.

2. The copolymer of claim 1 wherein the cyclic ester is a 5 to 9 membered ring.

3. The copolymer of claim 1 wherein the cyclic ester is a lactone selected from the group consisting of γ-butyrolactone, δ-valerolactone, ε-caprolactone and derivatives thereof.

4. The copolymer of claim 3 wherein the lactone is ε-caprolactone.

5. The copolymer of claim 1 wherein the cyclic formal is 1,3-dioxepane.

6. The copolymer of claim 1 which is polymerized from a sum of at least 75 wt. % of the cyclic aster and the cyclic formal based on the total weight of the copolymer.

7. The copolymer of claim 1 which is polymerized from monomers including one or more monomers other than the cyclic ester and the cyclic formal.

8. The copolymer of claim 7 which is polymerized from less than 50 wt. % of said one or more monomers other than the cyclic ester and the cyclic formal, based on the total weight of the copolymer.

9. The copolymer of claim 7 which is polymerized from less than 10 wt. % of said one or more monomers other than the cyclic ester and the cyclic formal, based on the total weight of the copolymer.

10. The copolymer of claim 7 which is polymerized from less than 1 wt. % of said one or more monomers other than the cyclic ester and the cyclic formal, based on the total weight of the copolymer.

11. The copolymer of claim 7 wherein the said one or more monomers other than the cyclic ester and the cyclic formal are one or more of 1,3-dioxepan-2-one, 5,5-dimethyl-1,3-dioxan-2-one, 1,3-dioxan-2-one, ethylene carbonate, propylene carbonate, 1-4-dioxane-2-one, 1,4-dioxepan-2-one, 1,5-dioxepan-2-one, 1,6-dioxepan-2-one, 3,6-dimethyl-1,4-dioxane-2,5-dione (lactide), 1,4-dioxane-2,5-dione (glycolide), and 1,3,5-trioxane.

12. The copolymer of claim 1 wherein the cyclic ester is caprolactone and the cyclic formal is 1,3-dioxepane.

13. The copolymer of claim 12 where the weight ratio of caprolactone to 1,3-dioxepane is from about 0.05:1 to 20:1.

14. The copolymer of claim 12 where the weight ratio of caprolactone to 1,3-dioxepane is from about 0.3:1 to 3:1.

15. The copolymer of claim 1 having a melting point below about 25° C.

16. An article made from the copolymer of claim 1.

17. A composition comprising the copolymer of claim 1 and a carbodiimide additive.

18. An article made from the composition of claim 17.

19. A polyurethane comprising the reaction product of an organic isocyanate and the copolymer of claim 1.

20. A polyurethane comprising the reaction product of:
 (a) an organic isocyanate; and
 (b) a copolymer polymerized from monomers including, (i) a cyclic ester of at least a five membered ring; and
(ii) a cyclic formal of a substituted or unsubstituted diol having at least 3 atoms between the hydroxyl groups of the diol;

wherein the cyclic ester and the cyclic formal monomers comprise at least 50 wt. % of the total monomers based on the total weight of the copolymer.

21. A process for the manufacture of a copolymer, comprising polymerizing, in the presence of a catalyst, monomers including:
(i) a cyclic ester of at least a five membered ring; and
(ii) a cyclic formal of a substituted or unsubstituted diol having at least 3 carbon atoms between the hydroxyl groups of the diol; wherein the cyclic ester and cyclic formal monomers comprise at least 50 wt. % of the total monomers based on the total weight of the copolymer; wherein the copolymer is polymerized in the presence of a polymerization initiator selected from the group consisting of ethylene glycol; 1,4-butanediol; 1,6-hexanediol; 1,3-propanediol; 2,2-dimethyl-1,3-propanediol; diethylene glycol; triethylene glycol; glycerol; 2-ethyl-2-hydroxymethyl-1,3-propanediol; 2-methyl-2-hydroxymethyl-1,3-propanediol; 2-methyl-2-ethyl-1,3-propanediol; 2-ethyl-2-butyl-1,3-propanediol; 1,3-bis(hydroxymethylcyclohexane); 1,4-bis(hydroxymethylcyclohexane); and mixtures thereof.

22. The process of claim 21 wherein the catalyst is selected from the group consisting of triflic acid, trifluoroacetic acid, methanesulfonic acid, fluorosulfonic acid, toluenesulfonic acid, phosphoric acid, anhydrous sulfuric acid, anhydrous hydrochloric acid, triflic anhydride and mixtures thereof.

23. The process of claim 22 wherein the catalyst is triflic acid.

24. The process of claim 21 further comprising adding a carbodiimide additive following the polymerization.

25. A composition comprising:
(a) a copolymer polymerized from monomers including,
(i) a cyclic ester of at least a five membered ring; and
(ii) a cyclic formal of a substituted or unsubstituted diol having at least 3 atoms between the hydroxyl groups of the diol;

wherein the cyclic ester and the cyclic formal monomers comprise at least 50 wt. % of the total monomers based on the total weight of the copolymer; and
(b) a carbodiimide additive.

26. An article made from the composition of claim 25.

27. A process for the manufacture of a copolymer, comprising polymerizing, in the presence of a catalyst, monomers including:
(i) a cyclic ester of at least a five membered ring; and
(ii) a cyclic formal of a substituted or unsubstituted diol having at least 3 carbon atoms between the hydroxyl groups of the diol; wherein the cyclic ester and cyclic formal monomers comprise at least 50 wt. % of the total monomers based on the total weight of the copolymer; and wherein the catalyst is selected from the group consisting of triflic acid, trifluoroacetic acid, methanesulfonic acid, fluorosulfonic acid, toluenesulfonic acid, phosphoric acid, anhydrous sulfuric acid, anhydrous hydrochloric acid, triflic anhydride and mixtures thereof.

28. The process of claim 27 further comprising adding a carbodiimide additive following the polymerization.

* * * * *